Feb. 16, 1965 L. SPRARAGEN 3,169,505
ADJUSTABLE DIAL FOR SHAFTS
Filed Nov. 14, 1962
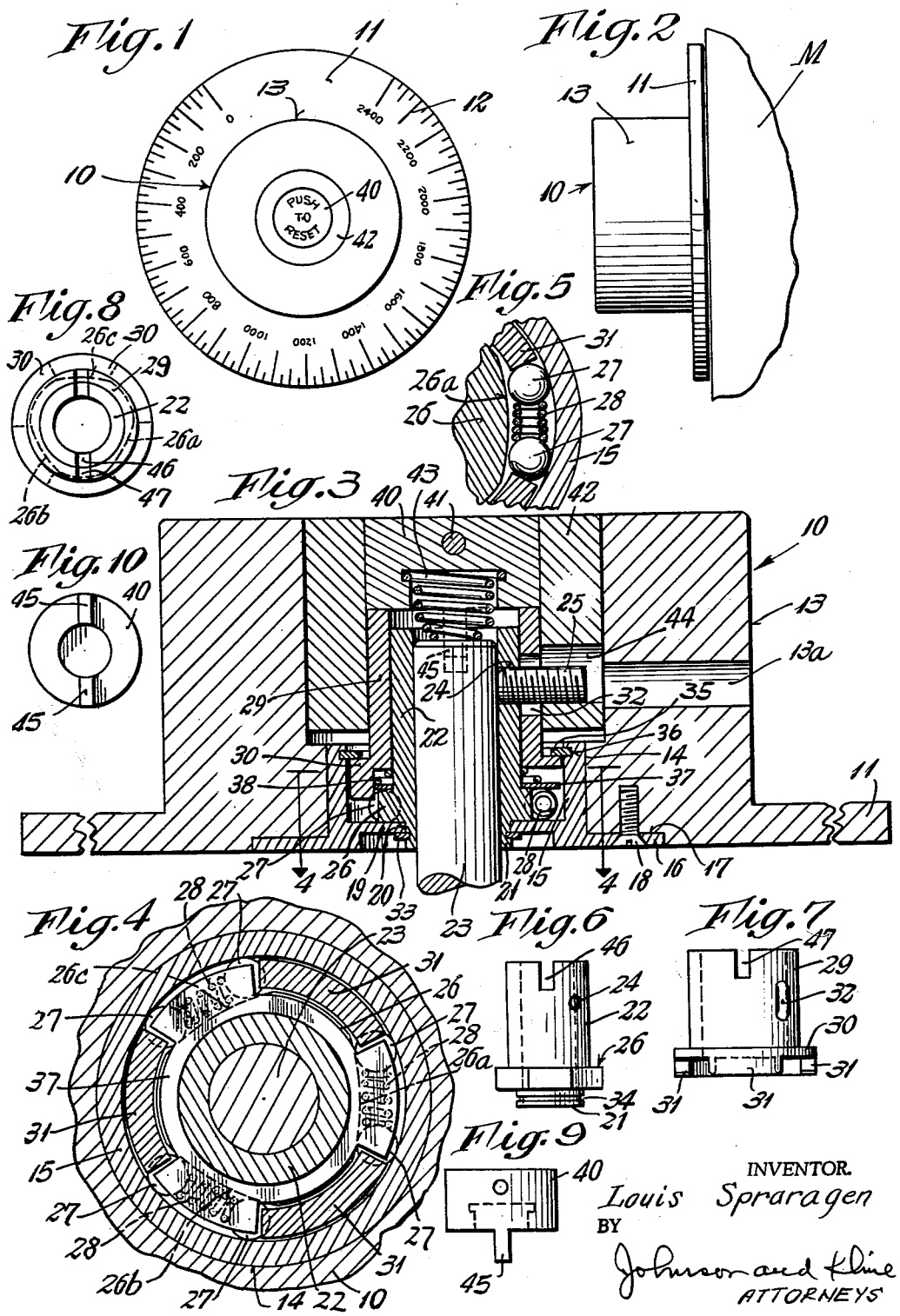
INVENTOR.
Louis Spraragen
BY
Johnson and Kline
ATTORNEYS

United States Patent Office 3,169,505
Patented Feb. 16, 1965

3,169,505
ADJUSTABLE DIAL FOR SHAFTS
Louis Spraragen, Fairfield, Conn.
(29 Federal St., Bridgeport, Conn.)
Filed Nov. 14, 1962, Ser. No. 237,525
11 Claims. (Cl. 116—124)

The present invention relates to a position indicating means for a shaft of an instrument, machine tool or the like, and more particularly to a dial having means to facilitate the adjustment thereof on the shaft to indicate the rotative position of the shaft.

Heretofore, dials have been provided on shafts for indicating the rotative position thereof with respect to a reference or zero point on the machine. These dials have been held in position on the shaft by clamping means or draw collets, all of which have required considerable efforts to release in order to adjust the dial and to relock the dial accurately in position on the shaft.

It is an object of the present invention to overcome these difficulties by providing an adjustable dial on the shaft which is normally locked in position on the shaft by locking means which can be quickly released by a simple pushing movement on an operator. The dial, when so released, can be readily adjusted on the shaft and as soon as the locking means is released, automatically locks the dial in adjusted position on the shaft.

A feature of the invention resides in the fact that the unlocking or releasing means for the lock when held in unlocking position also tends to hold the shaft against rotation so that the adjustment of the dial on the shaft is greatly facilitated.

Other features and advantages of the invention will be apparent from the specification and claims when considered in connection with the accompanying drawings in which:

FIGURE 1 shows a plan view of the resettable dial.
FIG. 2 is a side view of FIG. 1.
FIG. 3 is a longitudinal sectional view of the unit.
FIG. 4 is a sectional view taken along lines 4—4 of FIG. 3.
FIG. 5 is a partial sectional view, similar to that of FIG. 4, showing the locking balls in released position.
FIG. 6 is a side view of the cam sleeve.
FIG. 7 is a side view of the unlocking or release means.
FIG. 8 is a top view of the sleeves of FIGS. 6 and 7 in assembled relation.
FIG. 9 is a side view of the release button.
FIG. 10 is a bottom view of the release button.

The present invention, as herein illustrated, comprises a dial unit which is adapted to be mounted on a shaft of an instrument, machine tool or the like device M for indicating the rotative position of the shaft with respect to a reference or zero point on the device.

In accordance with the present invention the dial is automatically locked to the shaft and is readily unlocked so that it can be adjusted with respect to the shaft. The dial unit comprises a hub 10 having a flange 11 provided with suitable indicia 12 thereon. Preferably, the flange projects laterally from one end of the hub so that the outer surface 13 of the hub can function as a knob to be gripped in adjusting the dial on the shaft. The hub has a bore 14 therethrough and in the inner end of the bore an annular race 15 is mounted, the race having a laterally outwardly projecting flange 16 which is secured in a recess 17 in the end face of the hub by screws 18. The race also has an annular inwardly extending flange 19 having a central aperture 20 therein for receiving and locating the reduced end 21 of a sleeve 22 (FIG. 6), said sleeve being adapted to receive a shaft 23. The sleeve has a threaded hole 24 therein in which a set screw 25 is threaded into locking engagement with the shaft by means of a suitable tool (not shown) which can be inserted through a hole 13a in the hub.

The sleeve 22 is provided with cam means 26, herein illustrated as three uniformly spaced cam sections 26a, 26b, 26c, which, as shown in FIG. 4, are uniformly located in predetermined spaced relation with the race. Disposed between the race and cam means are pairs of locking elements, herein illustrated as balls 27, for each cam means, said balls being normally urged outwardly into locking relation with the race by a spring 28 disposed between the balls.

Slidably mounted on the sleeve 22 is a releasing means in the form of a second or unlocking sleeve 29 (FIG. 7) having a flange 30 at the inner end and with depending lugs or ball release members 31 projecting therefrom and adapted to be positioned so as to extend between the cam surfaces and being of a width to engage the outer surfaces of the balls so that when the unlocking sleeve or release member is moved inwardly, the lugs engage the balls and cause the springs between the balls to be compressed and the balls to be moved out of locking engagement, as shown in FIG. 5, thus permitting the race and dial member secured thereto to be free to move with respect to the cam.

The sleeve 29 is held in its proper position for limited axial movement by a slot 32 therein engaging an extension of the set screw 25.

The sleeves 22 and 29 are secured in assembled relation on the unit by means of a releasable spring washer 33 disposed in a groove 34 in the neck 21 of the sleeve and engaging the outer surface of the inwardly projecting flange 19 on the inner end of the race and by a resilient releasable washer 35 secured in a groove 36 in the other end of the race and overlying the flange 30 on the sleeve as shown in FIG. 3.

In accordance with the present invention, a keeper plate 37 is disposed between the end of the second sleeve 29 and the cam member 26 to overlie the balls and springs positioned thereby to prevent them from moving out of cooperative relation with the cam and raceway. Preferably, a spring 38 is disposed between the keeper and the end of the sleeve 29 to normally urge the sleeve and unlocking means or release means into an inoperative position.

While the dial may be mounted on a shaft so that the shaft extends therethrough in which case the operator for the release means would be an outwardly projecting annular flange on the outer end of the sleeve, in the illustrated form of the invention the dial unit is mounted on the end of the shaft and the operator for the release or unlocking means comprises a center button 40 pinned by 41 to a sleeve 42 slidable in the bore in the hub and surrounding the outer surface of the unlocking sleeve 29 with the inner surface of the button engaging the end of the sleeve 29 so that, as the button is pushed inwardly, it will cause the sleeve and its ball release elements to be moved into operative relation with the balls to release them out of locking position. Preferably, the button is moved to its normal position, in which as shown in FIG. 3 it is flush with the end of the hub, by means of a spring 43 located in a recess in the button and bearing against the edge of the shaft 23. The outward movement of the button in its flush position is controlled by the engagement of a slot 44 in the sleeve 42 cooperating with an extension of the set screw 25.

Preferably, the operator is provided with means for holding the shaft stationary while the dial is adjusted. As illustrated in FIGS. 6–10, the undersurface of the button 40 is provided with a pair of prongs 45 or keys adapted to move into aligned slots or keyways 46, 47 in the ends of the cam sleeve 22 and the unlocking sleeve 29, respectively, which are secured to the shaft for rotation therewith by the set screw 25. When pressure is applied to the button to operate the release member for the locking members, the pressure will also hold the shaft against rotation while the dial is adjusted.

If desired, the outer surface 13 of the hub can form a knob to be gripped to rotate the dial during the adjustment thereof or to rotate the shaft when the dial unit is locked to the shaft.

In the operation of the device, when it is desired to adjust the dial member to a zero or other predetermined position on the shaft of an instrument, machine tool or the like, it is merely necessary to apply pressure to the button 40. This moves the button inwardly and causes the forks 45 to interlock with the slots in the cam sleeve and release or unlocking sleeve which are secured to the shaft. This will hold the shaft against rotary movement and at the same time releases the locking means to free the dial for adjustment. The hub is gripped by the fingers of the other hand and the dial turned to the required position. The pressure on the button is then released and the dial is automatically and accurately locked to the shaft in its adjusted position thereon.

It will be seen that with such a construction the adjustment is greatly simplified, quick and accurate since it is unnecessary to operate a locking or clamping nut and danger of altering the adjusted position by the turning up of a locking and clamping nut after the adjustment has been made, as was the case in the prior art, is completely eliminated.

Variations and modifications may be made within the scope of the claims and portions of the improvements may be used without others.

I claim:

1. A dial unit including a hub forming a knob provided with an integral dial member having indicia thereon adapted to be adjustably positioned on a shaft to indicate the position thereof comprising cooperating cam means and a race, one secured to the dial member and the other secured to the shaft, a plurality of balls disposed between the cam means and race and urged by spring means into locking relation therewith whereby said dial member is normally locked to rotate with said shaft, and release means mounted within the knob on the dial member for axial movement with respect to the knob and shaft and having means for moving the balls against the spring means and out of locking relation to enable the dial member to be rotated in either direction with respect to the shaft to adjust the rotative position of the dial member and the indicia thereon with respect thereto.

2. A dial unit including a hub forming a knob provided with an integral dial member having indicia thereon adapted to be adjustably positioned on a shaft to indicate the position thereof comprising a cam means secured to said shaft, a race secured to the dial member to surround the cam means on the shaft in spaced relation therewith, a plurality of balls disposed between the cam means and race and urged by spring means into locking relation therewith whereby said dial member is locked to rotate with said shaft, and release means mounted within the knob on the dial member for axial movement with respect to the shaft and having means for moving the balls against the spring means and out of locking relation to enable the dial member to be rotated by the knob in either direction with respect to the shaft to adjust the rotative position of the dial member and the indicia thereon with respect thereto.

3. A dial unit having a dial provided with indicia thereon adapted to be mounted on a shaft and readily rotatively adjusted thereon to indicate the position of the shaft comprising a sleeve having a cam means thereon to be secured to said shaft, a race secured to a dial member to surround the cam means on the shaft in spaced relation therewith, a plurality of balls disposed between the cam means and race and urged by spring means into locking relation therewith whereby said dail is locked to rotate with said shaft, release means comprising a sleeve mounted on the unit for axial movement with respect to the shaft and having means for moving the balls against the spring means and out of locking relation to enable the dial member to be rotated in either direction with the shaft to adjust the rotative position of the dial with respect thereto, a separate keeper means disposed between the end of the sleeve on the release means and the cam means and having portions overlying the balls and spring means therefor, and resilient means urging the keeper means into position to maintain the bails in cooperative position between the race and cam means.

4. A dial unit including a knob provided with a dial member having indicia thereon adapted to be adjustably positioned on a shaft to indicate the position thereof comprising a cam means secured to said shaft, a race secured to the dial member to surround the cam means on the shaft in spaced relation therewith, a plurality of balls disposed between the cam means and race and urged by spring means into locking relation therewith whereby said dial member is locked to rotate with said shaft, and release means mounted on the dial member for axial movement with respect to the shaft and normally urged to an inoperative position, said means having means for moving the balls against the spring means and out of locking relation when moved to operative position to enable the dial member to be rotated in either direction with respect to the shaft to adjust the rotative position of the dial member and the indicia thereon with respect thereto, and operating means mounted within the knob for moving the release means to operative position to release the dial member for rotation and for holding the shaft against rotation during the adjustment of the dial member.

5. A dial unit having a knob provided with a dial member provided with indicia thereon adapted to be adjustably positioned on a shaft to indicate the position thereof comprising a sleeve having a cam means thereon secured to said shaft, a race secured to the dial member to surround the cam means on the shaft in spaced relation therewith, a plurality of balls disposed between the cam means and race and urged by spring means into locking relation therewith whereby said dial member is locked to rotate with said shaft, release means mounted for axial movement with respect to the shaft and having means for moving the balls against the spring means and out of locking relation for releasing the dial member for rotation in either direction with respect to the shaft to adjust the rotative position of the dial thereon, and push-button means mounted within the knob for operating the release means, said push-button means including interlocking means for locking the shaft thereto when the push-button means is operated to release the locking relation whereby the shaft can be held stationary while the dial is rotated on the shaft.

6. A position indicating device comprising a dial unit having a hub provided with a bore therethrough and a flange projecting from the hub and having indicia thereon, said dial unit being adapted to be adjustably positioned on a shaft to determine the position thereof, a race secured to said dial unit and disposed in the inner end of said bore, a sleeve disposed within the bore and adapted to be secured to the shaft and having cam means thereon in spaced relation with the race, a plurality of balls disposed between the cam means and race and urged by spring means into locking relation therewith whereby said dial unit is locked to rotate with said shaft, release means mounted within the bore for axial movement with respect to the shaft and having means for moving the balls against the spring means and out of locking relation to enable the dial unit to be rotated in either direction with respect to the shaft to adjust the position of the indicia on the flange with respect to the shaft, means normally urging the release means to inoperative position, and means slidably mounted in the outer end of the bore and located within the hub for moving the release means into operative position whereby the flange is released for free adjusting movement.

7. A dial unit comprising a dial member having a hub provided with a bore therethrough and a flange projecting from the hub and having indicia thereon, said dial member being adapted to be adjustably positioned on a shaft to determine the position thereof, a race secured to the dial member and disposed in the inner end of said bore, a sleeve disposed within the bore and adapted to be secured to the shaft and having cam means thereon in spaced relation with the race, a plurality of balls disposed between the cam means and race and urged by spring means into locking relation therewith whereby said dial member is locked to rotate with said shaft, release means mounted within the bore and on the sleeve for axial movement with respect to the shaft and having means for moving the balls against the spring means and out of locking relation to enable the dial member to be rotated in either direction with respect to the shaft to adjust the position of the dial member with respect thereto, means normally urging the release means to inoperative position, and operator means mounted in the outer end of the bore and operative upon inward movement under pressure for moving the release means into operative position whereby the dial member is released for free adjusting movement, said operator means including means for locking the shaft thereto to hold it against rotation during rotation of the hub and flange with respect to said shaft.

8. A dial unit comprising a dial member having a hub provided with a bore therethrough and a flange projecting from the hub and having indicia thereon, said dial member being adapted to be adjustably positioned on a shaft to determine the position thereof, a race member having an annular race secured to the dial member and disposed in the inner end of said bore, a sleeve disposed within the bore and adapted to be secured to the shaft and having cam means thereon in spaced relation with the race, a plurality of balls disposed between the cam means and race and urged by spring means into locking relation therewith whereby said dial member is locked to rotate with said shaft, release means including a second sleeve mounted within the bore and slidable on the sleeve for axial movement with respect to the shaft and having means for moving the balls against the spring means and out of locking relation to enable the dial member to be rotated in either direction with respect to the shaft to adjust the position of the dial member with respect thereto, means cooperating with said sleeves and said race member for preventing separation thereof, means normally urging the release means to inoperative position, and means mounted in the outer end of the bore for closing the bore and operative upon inward pressure thereon for moving the release means into operative position whereby the dial member is released for free adjusting movement.

9. A dial unit comprising a dial member having a hub provided with a bore therethrough and a lateral flange projecting from the hub and having indicia thereon, said dial member being adapted to be adjustably positioned on a shaft to indicate the position thereof, a race secured to the dial member and disposed in the inner end of said bore, a sleeve disposed within the bore and adapted to be secured to the shaft and having cam means thereon in spaced relation with the race, a plurality of balls disposed between the cam means and race and urged by spring means into locking relation therewith whereby said member is locked to rotate with said shaft, keeper means overlying the spring means and parts of the balls to maintain the balls in position, release means mounted within the bore and on the sleeve for axial movement with respect to the shaft and having means extending into engagement with the balls for moving the balls against the spring means and out of locking relation to enable the dial member to be rotated in either direction with respect to the shaft to adjust the position of the dial member with respect thereto, means normally urging the release means to inoperative position, and means mounted in the outer end of the bore for moving the release means into operative position whereby the dial member is released for free adjusting movement.

10. A dial unit comprising a dial member having a hub provided with a bore therethrough and a flange projecting from the hub and having indicia thereon, said dial member being adapted to be adjustably positioned on a shaft to indicate the position thereof, a race secured to the dial member and disposed in the inner end of said bore, a first sleeve disposed within the bore and adapted to be secured to the shaft and having cam means thereon in spaced relation with the race, a plurality of balls disposed between the cam means and race and urged by spring means into locking relation therewith whereby said member is locked to rotate with said shaft, keeper means overlying the spring means and parts of the balls to maintain the balls in position, release means comprising a second sleeve mounted within the bore and slidable on the first sleeve for axial movement with respect to the shaft and having means extending into engagement with the balls for moving the balls against the spring means and out of locking relation to enable the dial member to be rotated in either direction with respect to the shaft to adjust the position of the dial member with respect thereto, resilient means between the keeper means and end of the second sleeve normally urging the release means to inoperative position and the keeper means in ball-retaining position, and means mounted in the outer end of the bore for moving the release means into operative position whereby the dial member is released for free adjusting movement.

11. A dial unit comprising a dial member having a hub provided with a bore therethrough and a flange projecting from the hub and having indicia thereon, said dial member being adapted to be adjustably positioned on a shaft to indicate the position thereof, a race secured to the dial member and disposed in the inner end of said bore, a first sleeve disposed within the bore and adapted to be secured to the shaft and having cam means thereon in spaced relation with the race, a plurality of balls disposed between the cam means and race and urged by spring means into locking relation therewith whereby said member is locked to rotate with said shaft, keeper means overlying the spring means and parts of the balls to maintain the balls in position, release means comprising a second sleeve mounted within the bore and slidable on the first sleeve for axial movement with respect to the shaft and having means extending into engagement with the balls for moving the balls against the spring means and out of locking relation to enable the dial member to be rotated in either direction with respect to the shaft to adjust the position of the dial member with respect thereto, resilient means between the keeper means and end of the second sleeve normally urging the release means to inoperative position and the keeper means in ball-retaining position, push-button means slidably mounted in the outer end of the bore from a retracted position for moving the release means into operative position whereby the dial member is released for free adjusting movement, said push-button means having means thereon for holding said shaft against rotation while pressure is applied thereto to release the locked relation of the balls whereby the dial can be readily adjusted with respect to the shaft, and spring means between the end of the shaft and the push-button means to normally urge the button to said retracted position.

References Cited by the Examiner
UNITED STATES PATENTS
2,914,153   11/59   Krause et al. _____ 192—8

LOUIS J. CAPOZI, *Primary Examiner.*